United States Patent
Abdulla et al.

(10) Patent No.: US 12,060,164 B2
(45) Date of Patent: Aug. 13, 2024

(54) DIFFERENTIATING UNMANNED VEHICLES BY CHANGING EXTERIOR APPEARANCE

(71) Applicant: International Business Machines Corporation, Armonk, NY (US)

(72) Inventors: Rizwan Sheikh Abdulla, Bangalore (IN); Konda Reddy Dumpa, Bangalore (IN); Shivarudrappa Satyanaik, Bangalore (IN); Seema Nagar, Bangalore (IN); Kuntal Dey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 16/813,878

(22) Filed: Mar. 10, 2020

(65) Prior Publication Data
US 2021/0284354 A1 Sep. 16, 2021

(51) Int. Cl.
| | |
|---|---|
| G05D 1/00 | (2024.01) |
| B64C 39/02 | (2023.01) |
| B64D 47/02 | (2006.01) |
| H04W 4/46 | (2018.01) |
| H05B 45/20 | (2020.01) |
| B64U 101/60 | (2023.01) |

(52) U.S. Cl.
CPC .......... *B64D 47/02* (2013.01); *B64C 39/024* (2013.01); *H04W 4/46* (2018.02); *H05B 45/20* (2020.01); *B64U 2101/60* (2023.01); *B64U 2201/10* (2023.01)

(58) Field of Classification Search
CPC . B64D 47/02; B64C 39/024; B64C 2201/128; B64C 2201/141; H04W 4/46; H05B 45/20
See application file for complete search history.

(56) References Cited

U.S. PATENT DOCUMENTS

| | | | |
|---|---|---|---|
| 8,750,517 B2 | 6/2014 | Kymissis | |
| 9,077,754 B2 * | 7/2015 | Gonuguntla | ........ H04L 63/0281 |
| 2010/0250022 A1 | 9/2010 | Hines | |
| 2015/0058242 A1* | 2/2015 | Bucciarelli | ............. H04W 4/16 |
| | | | 705/325 |
| 2016/0058133 A1* | 3/2016 | Fournier | ............ A61B 5/02141 |
| | | | 63/3.1 |
| 2017/0255264 A1 | 9/2017 | Dash | |
| 2019/0369613 A1* | 12/2019 | Moon | ................... B64C 39/024 |
| 2020/0410540 A1* | 12/2020 | Williams | .................. G09F 9/30 |

FOREIGN PATENT DOCUMENTS

| | | | | |
|---|---|---|---|---|
| CN | 204731848 U | 10/2015 | | |
| CN | 207045764 U | 2/2018 | | |
| CN | 109819237 A | * 5/2019 | ............... G06T 1/00 |
| DE | 202018106776 U1 | 12/2018 | | |
| KR | 20180017810 A | 2/2018 | | |

* cited by examiner

*Primary Examiner* — Adam M Alharbi
(74) *Attorney, Agent, or Firm* — Scott S. Dobson

(57) ABSTRACT

An unmanned vehicle includes a body, a propulsion system connected to the body, a computing system connected to the body, and a display connected to an exterior of the body and electrically connected to the computing system. In addition, the computing system is configured to dynamically change the appearance of the display during operation of the unmanned vehicle.

16 Claims, 5 Drawing Sheets

DIFFERENTIATING UNMANNED VEHICLES BY CHANGING EXTERIOR APPEARANCE

BACKGROUND

The present invention relates to the appearance of vehicles, and more specifically, to changing the coloration of an unmanned aerial vehicle (UAV) (e.g., a drone).

A drone is an aircraft without a human pilot onboard, so the drone can be controlled by having communication with a ground-based remote controller and/or operated autonomously using a built-in computer. Drone technology can be used for many different applications, such as military, commercial, scientific, recreational, and agricultural, among others. Amongst these applications, drones can perform a variety of tasks, such as policing, peacekeeping, surveillance, parcel delivery, photography, videography, fertilizer/herbicide/pesticide delivery, and racing, among others. Like most traditional vehicles, drones are traditionally colored, painted, and/or decorated in static colorways that are set during the manufacturing process.

SUMMARY

According to some embodiments of the present disclosure, an unmanned vehicle includes a body, a propulsion system connected to the body, a computing system connected to the body, and a display connected to an exterior of the body and electrically connected to the computing system. In addition, the computing system is configured to dynamically change the appearance of the display during operation of the unmanned vehicle.

According to some embodiments of the present disclosure, a method of controlling an unmanned vehicle includes receiving a first journey information, wherein the first journey information includes a first core purpose of the vehicle for a first journey. The method also includes setting an exterior display of the vehicle to a first appearance based on the first core purpose.

According to some embodiments of the present disclosure, a method of controlling a first unmanned vehicle includes receiving a journey information regarding a journey of the first unmanned vehicle and setting an exterior display of the first unmanned vehicle to a first appearance based on the journey information. The method also includes encountering a second unmanned vehicle having a second appearance that is substantially similar to the first appearance as to be at or above a threshold value for similarity and changing the exterior display of the first unmanned vehicle to a third appearance. Furthermore, the third appearance is different from the first appearance and the second appearance.

DETAILED DESCRIPTION

Figure 1A:
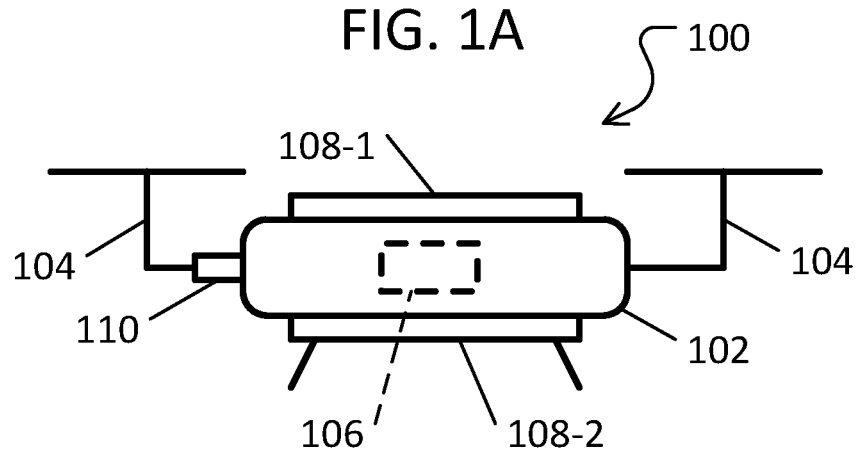
FIG. 1A is a side view of a UAV according to an embodiment of the present disclosure.
Figure 1B:
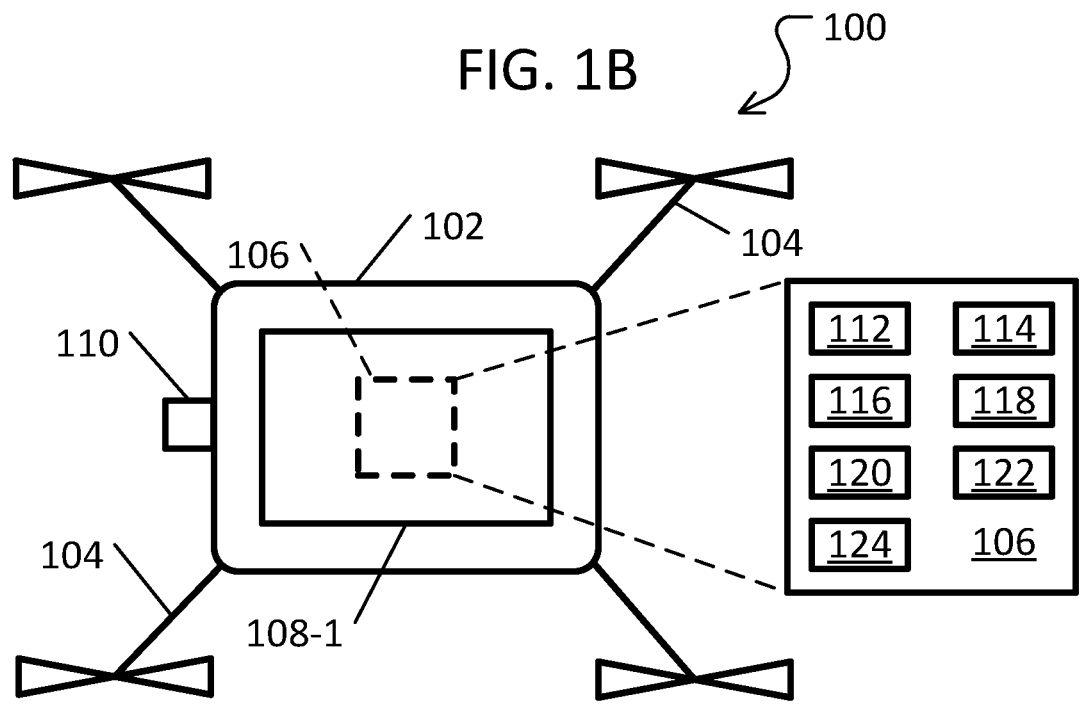
FIG. 1B is a top view of the UAV according to an embodiment of the present disclosure.

FIG. 1A is a side view of UAV 100 according to an embodiment of the present disclosure. FIG. 1B is a top view of UAV 100 according to an embodiment of the present disclosure. FIGS. 1A and 1B will now be discussed in conjunction with one another.

In the illustrated embodiment, UAV 100 includes body 102, rotor assemblies 104, computer 106, displays 108-1 and 108-2, and sensor 110. Rotor assemblies 104 extend from the exterior of body 102 and propel UAV 100 through the air. Computer 106 is housed in body 102 and includes several modules such as processor module 112, memory module 114, communication module 116, navigation module 118, motion module 120, display module 122, and sensor module 124. Communication module 116 allows UAV 100 to communicate with other UAVs, its source, and/or a central controller (shown in FIG. 2). Navigation module 118 autonomously controls the location and gross movement of UAV 100 to and from various destinations (for example, using global positioning system (GPS) information) while motion module 120 controls the fine movements of UAV 100 to maintain stability and course during flight. In other embodiments, navigation module 118 is wirelessly connected to a remote controller such that UAV 100 can be controlled by a remote user.

Display module 122 can control displays 108-1 and 108-2 (collectively "displays 108"). Displays 108 are connected to the exterior of body 102 and project outward therefrom. Displays 108 determine the appearance of UAV 100 and can convey message(s) to observers of UAV 100. Displays 108 can show lines, shapes, and/or colors, as will be described later with respect to FIG. 5. Displays 108 can be of any suitable type of display that can change the appearance of UAV 100, such as a light emitting diode (LED), a plasma display panel (PDP), a color-changing dye, a color-reflecting material (that can be colored by LEDs), and/or a fiber optic array, among others. While the illustrated embodiment includes two displays 108, in other embodiments, there are more displays 108. In yet other embodiments, there is only one display 108, and in some of such embodiments, the one display 108 can extend over most or all of body 102.

Sensor module 124 can control sensor 110, which is connected to the exterior of body 102. Sensor 110 can sense, for example, light intensity and color above, below, and around UAV 100. This information can be used as input into the control of displays 108. For example, when UAV 100 is in a bright environment, displays 108 can be brighter than when UAV 100 is in a dark environment. While the illustrated embodiment only includes one sensor 110, in other embodiments, there are multiple sensors 110.

Figure 2:
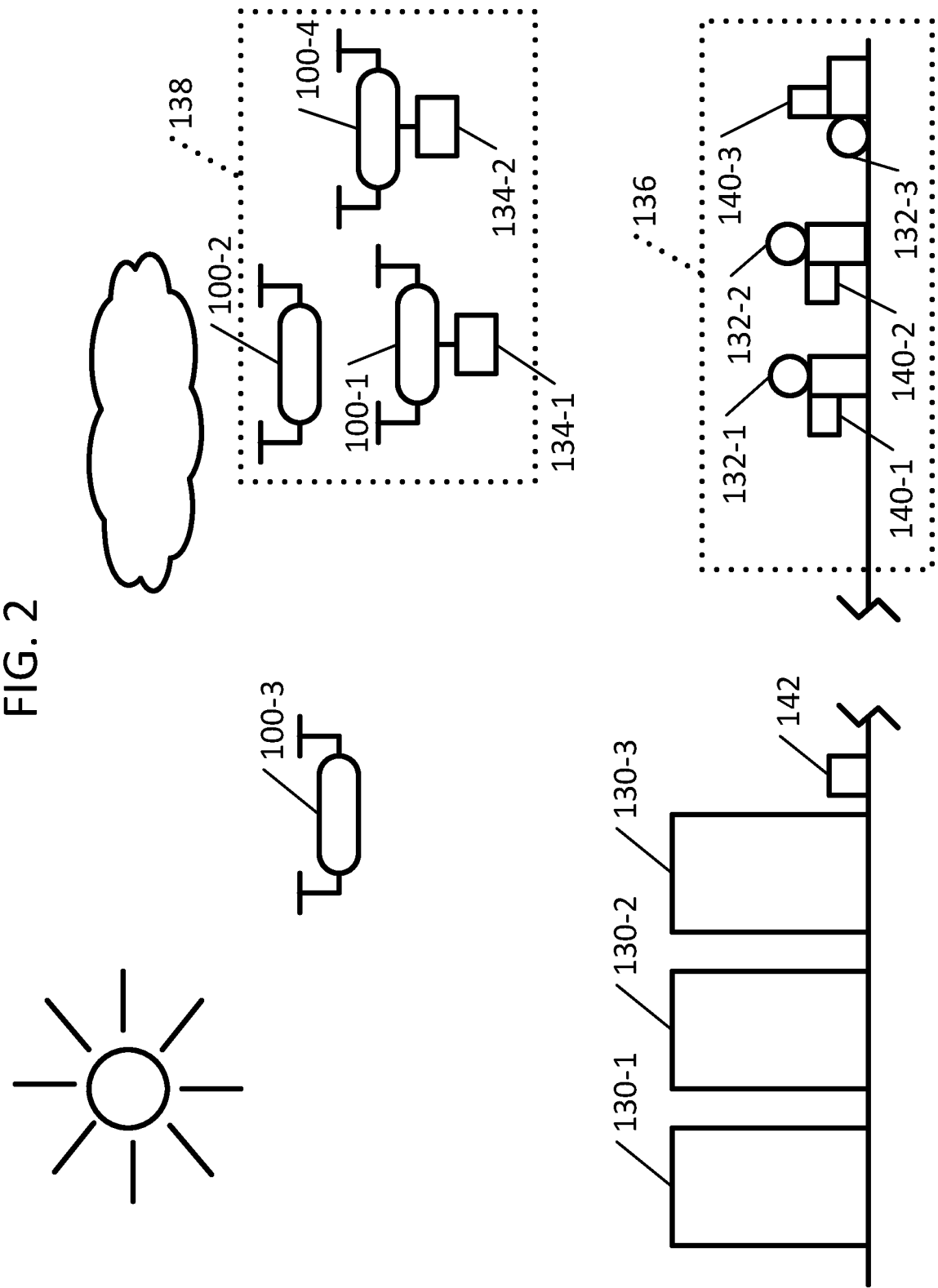
FIG. 2 is a schematic view of an operating environment for multiple UAVs including multiple sources and multiple users according to an embodiment of the present disclosure.

The components and configuration of UAV 100 allows for the appearance of UAV 100 to be changed dynamically. This can occur according to on-board information or due to communication with other parties, such as a central controller or other UAVs 100 in the area (as shown in FIG. 2). While UAV 100 is an aerial vehicle, in other embodiments, UAV 100 is a ground-based or aquatic vehicle (e.g., a car or a boat, respectively).

FIG. 2 is a schematic view of an operating environment for multiple UAVs 100 including multiple sources 130 and multiple users 132 according to an embodiment of the present disclosure. In the illustrated embodiment, there are four UAVs 100 (specifically, 100-1, 100-2, 100-3, and 100-4); three sources 130 (e.g., buildings or company facilities) (specifically, 130-1, 130-2, and 130-3); and three users 132 (specifically, 132-1, 132-2, and 132-3), although there can be greater or fewer numbers of UAVs 100, sources 130, and/or users 132 in other embodiments.

In the illustrated embodiment, UAVs 100-1 and 100-4 originate from, are owned by, and/or are controlled by source 130-1; UAV 100-2 originates from, is owned by, and/or is controlled by source 130-2; and UAV 100-3 originates from, is owned by, and/or is controlled by source 130-3. Because source 130-1 is a retail outlet, payload 134-1 is connected to the body of UAV 100-1 and is for user 132-1, and payload 134-2 is connected to the body of UAV 100-4 and is for user 132-2. Because source 130-2 is a local police department, UAV 100-2 is a surveillance unit sent to generally observe public spaces, and because source 130-3 is a hospital, UAV 100-3 is an emergency response unit sent to assist user 132-3.

In the illustrated embodiment, users 132 are relatively closely gathered in a public space that is destination 136. Therefore, UAVs 100 are all headed to destination 136, and at a given time, UAVs 100-1, 100-3, and 100-4 are relatively closely gathered in airspace 138. This can make it difficult for users 132 to determine which UAV is intended for them. Thereby, each user 132 has a mobile device 140 (specifically, 140-1, 140-2, and 140-3, respectively) that can include an application that will tell each user 132 what the appearance of their respective UAV 100 will be when it arrives at destination 136.

As discussed with respect to FIG. 1, UAVs 100 can change their appearance, for example, using displays 108. Thereby, when a source 130 sends out a UAV 100, UAV 100 can receive journey information. The journey information includes data regarding the current expedition of the UAV 100. For example, journey information can include the source 130 of UAV 100, core purpose of the journey, details of any payload being transported, journey navigation (e.g., location of destination 136 and/or pathway to destination 136), preferences of localities along the journey/pathway and at destination 136, allowed and/or prohibited appearances of the UAV 100, and preference list of appearances of UAV 100, among other things. The UAV 100 can analyze the journey information to initially set an appearance, and the journey information can be revisited periodically throughout the journey to see if the appearance should be changed and if so, what it should be changed to.

For example, a UAV 100 can set its appearance based on its source 130 for that journey. In such embodiments, each source 130 can have a different appearance that its UAVs 100 take on during a portion or the entirety of their journeys. For another example, a UAV 100 can set its appearance based on the core purpose of the current journey. In such embodiments, there can be a table that correlates core purposes with appearances (e.g., a red cross being the appearance for a medical aid core purpose, or an overall blue color being the appearance for a surveillance purpose). For another example, a UAV 100 can set its appearance based on the details of any payload being transported. In such embodiments, the appearance of the UAV 100 is the colorway or predominant color of the payload. For another example, a UAV 100 can set its appearance based on journey navigation and preferences of the localities along the journey and at destination 136. In such embodiments, there can be a table that correlates location with colorways of various regions (e.g., Jaipur, India is known as the "pink city", while a blue and white colorway is common in Kolkata, India). These correlations can be based on the local culture, government, and/or athletic team(s), among other things. Furthermore, a UAV 100 can discover preferences of the localities along the journey and at destination 136. For example, sensor 110 can detect the colorways of apparel that people are wearing, and the UAV 100 can mimic a predominant colorway, if there is one (e.g., at a sporting event, many people can be wearing the home team's jerseys and/or colors). Similarly, in other embodiments, a UAV 100 can discover the colorway of apparel of its respective user 132, and the UAV 100 can change its appearance to match.

While the aforementioned journey information can be used to set the appearance of a UAV 100, there may also be lists of allowed and/or prohibited appearances. These lists can be absolute (i.e., constant regardless of the journey or conditions), related to the journey information (i.e., possible to change at the beginning of each journey), and/or frequently varying (i.e., related to the current conditions and/or location). For examples of the first, green can be an allowed appearance for being a relatively uncommon color on conventional UAVs, whereas white and black can be prohibited appearances for being too ubiquitous among conventional UAVs. For examples of the second, red can be an allowed appearance for a medical aid core purpose, whereas a colorway associated with a given region can be prohibited when the UAV 100 is located in a neighboring region. For examples of the third, yellow can be an allowed appearance in low-light conditions (as sensed by sensor 110, shown in FIG. 1B) due to its visibility, whereas brown can be a prohibited appearance in low-light conditions due to its lack of visibility. However, in other examples of the third, if visibility is undesirable, then brown can be allowed whereas yellow can be prohibited. In some embodiments, the visibility of an appearance can be determined by calculating the difference between the red-greed-blue values of a UAV's colorway and a digital representation of the ambient environment (e.g., the sky and any clouds present) and comparing that to a predetermined threshold value.

The preference list of appearances can be employed when there is a conflict between the allowed and/or prohibited lists and the desired appearance that a UAV 100 would otherwise employ based on, for example, journey information. The preference list includes an ordered list of appearances from most preferred to least preferred. Therefore, when there is a desired appearance that cannot be used at a given time, the preference list can be consulted, and another appearance can be selected. This appearance can be compared to the allowed and/or prohibited lists to determine if it is acceptable. If so, then that appearance will be used by the UAV 100, but if not, then the process can be repeated iteratively down the preference list until an acceptable appearance is determined. As with the allowed and/or prohibited lists, the preference list can be absolute, related to the journey information, and/or dynamic. In addition, the preference list can include a default appearance that will be resorted to in case the conflicts cannot be resolved. This default appearance can be any appearance, or it can be a state wherein displays 108 (shown in FIG. 1B) is powered-down.

When there are multiple UAVs 100 close together (for example, UAVs 100-1, 100-2, and 100-4 in airspace 138), it can be desirable to have each UAV 100 present a different appearance. While this is not always necessary, it can be helpful when airspace 138 is near destination 136 so that users 132 can recognize their respective UAV 100 amongst the other UAVs 100. In some embodiments, there can be a central controller 142 (which can be a stand-alone device as shown, or one of sources 130) that is responsible for solving conflicts between UAVs 100 that are in the same area and/or approaching the same destination 136 and displaying or desiring to display the same or a similar appearance. For example, two appearances can be substantially similar when one UAV 100 has a threshold percentage of the area of its displays 108 (or the exterior of its body 102) having the same colorway as another UAV 100. In some embodiments, this threshold is 66%, in other embodiments it is 75%, 85%, 90%, 95%, 98%, or 99%.

In some embodiments, central controller 142 will dictate which UAV 100 presents which appearance and/or the order in which the UAVs 100 are allowed to select their appearance. Central controller 142 can make these decisions based on, for example, the journey information (including core purpose, among other things), departure time, arrival time, and/or source 130 of each affected UAV 100. For example, if the core purpose is medical aid, that UAV 100 can have priority in selecting its appearance over other UAVs 100. On the other hand, central controller 142 can force multiple UAVs 100 to have the same appearance, for example, if the multiple UAVs 100 are all traveling to the same user 132.

The components and configuration of UAVs 100 allow for their appearances to be changed dynamically along their respective journeys. Furthermore, a UAV 100 can change its appearance to a destination colorway within a threshold distance of destination 136, and the destination colorway can be transmitted to a mobile device 140 of a respective user 132. After reaching destination 136 and performing its assigned task(s), the UAV 100 can continue on its journey by returning to its respective source 130 (or to a different source 130) so that it can start another journey later in time. In addition, appearance conflicts can be resolved between multiple UAVs 100 if it would be beneficial to do so.

Figure 3:
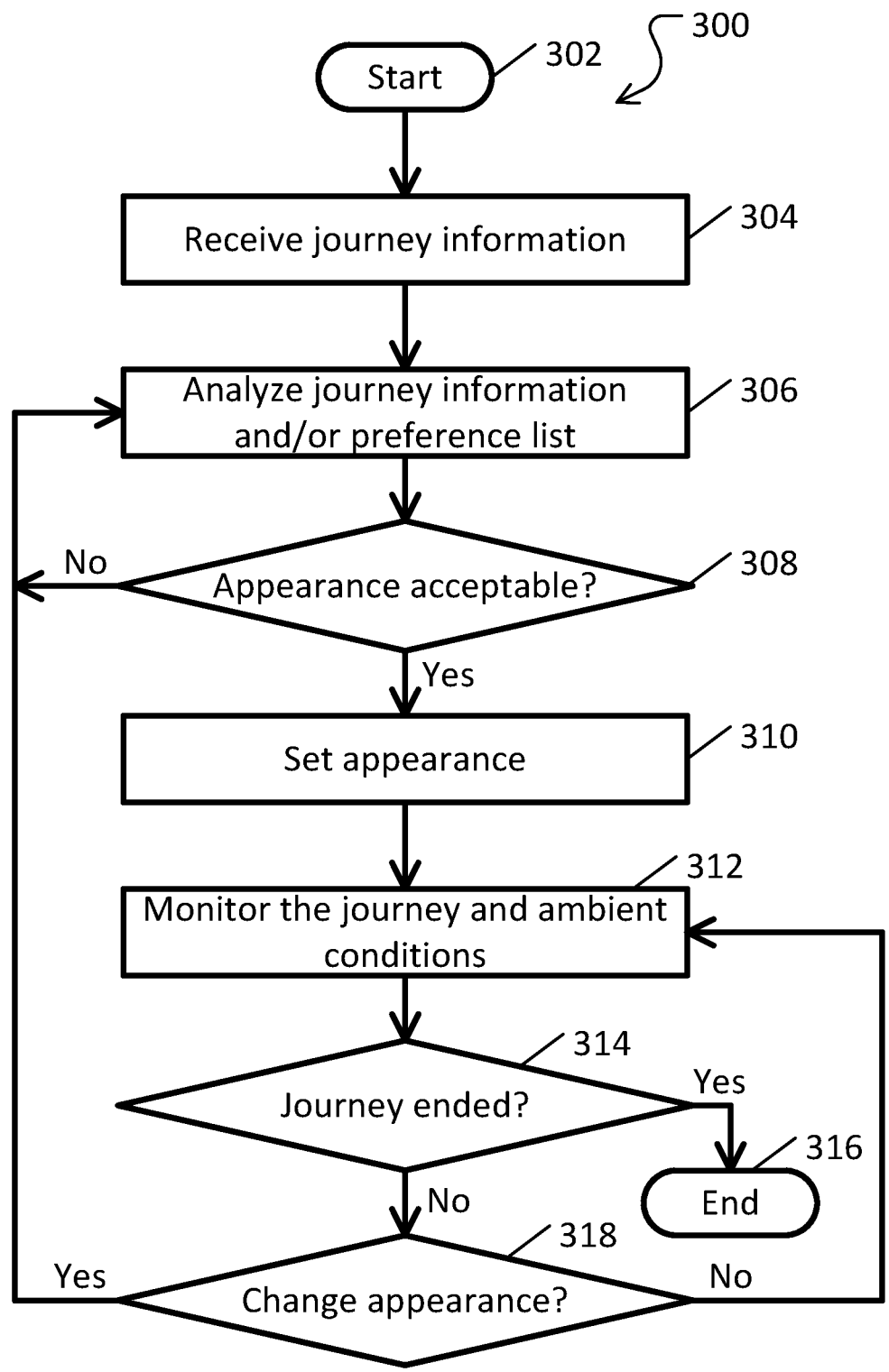
FIG. 3 is a method of setting a UAV appearance according to an embodiment of the present disclosure.

FIG. 3 shows method 300 of setting an appearance of a UAV 100 according to an embodiment of the present disclosure. During the discussion of FIG. 3, reference will be made to some of the features shown and discussed with respect to FIGS. 1A, 1, and 2. Method 300 begins at step 302.

In the illustrated embodiment, at step 304, the journey information is received by UAV 100. At step 306, the journey information is analyzed, for example, by UAV 100, its source 130, and/or central controller 142, and a desired appearance is determined. At step 308, the desired appearance is compared to the allowed and/or prohibited lists. If the desired appearance is rejected, then method returns to step 306 to reanalyze the journey information along with the preference list to determine another desired appearance. On the other hand, if the desired appearance is accepted at step 308, then at step 310, the desired appearance is set as the appearance, and displays 108 are configured accordingly. At step 312, the progress of the journey and the ambient conditions are monitored, for example, by navigation module 118 and sensor 110, respectively. At step 314, it is determined whether the journey has been completed. If so, then method 300 ends at step 316 (and can be restarted at step 302 at the beginning of the next journey). If not, it is determined whether UAV 100 should change its appearance at step 318, for example, based on the journey progress and the ambient conditions. If so, then method returns to step 306, but if not, method returns to step 312.

Figure 4:
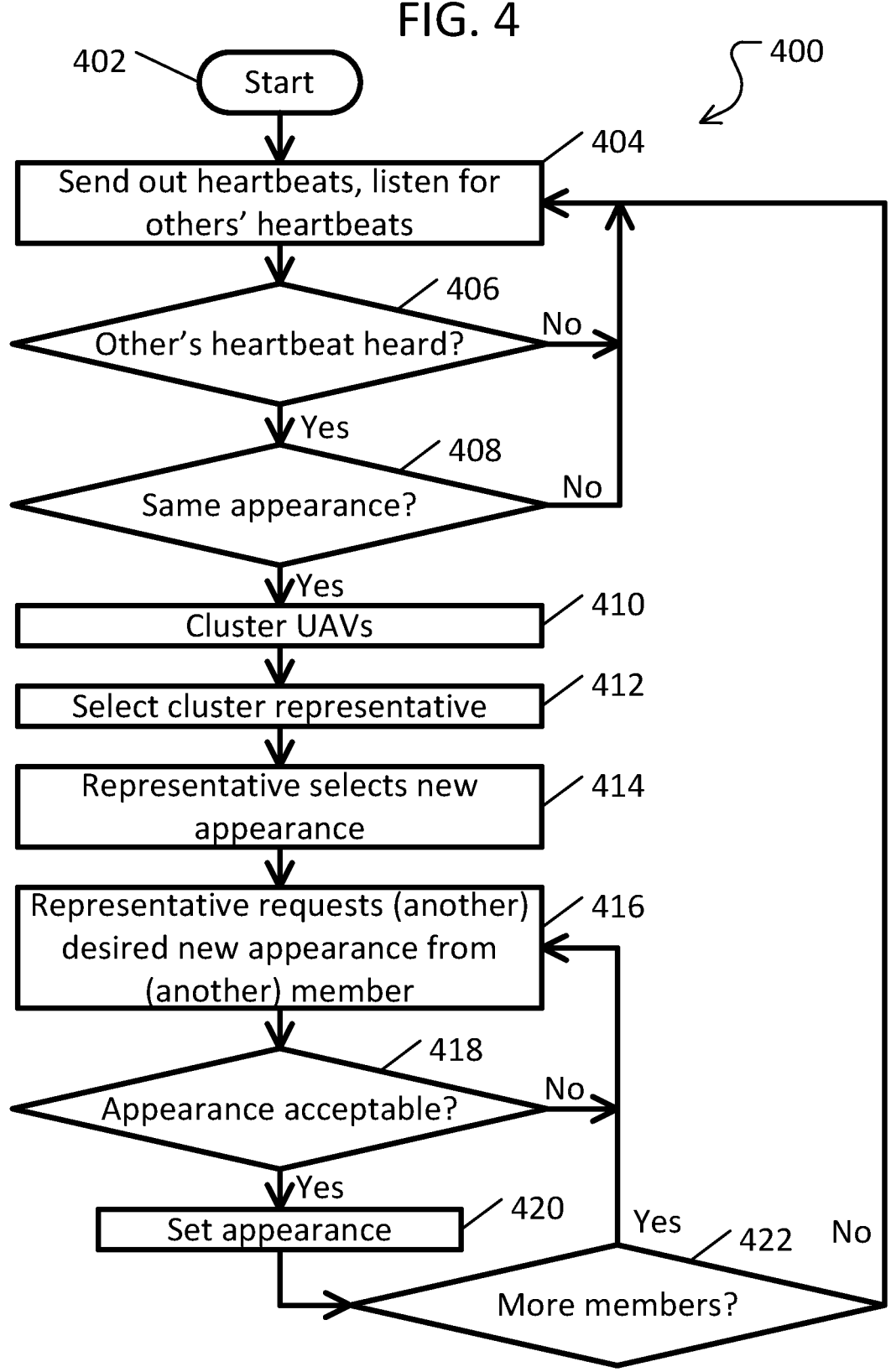
FIG. 4 is a method of setting UAV appearances in an operating environment with multiple UAVs according to an embodiment of the present disclosure.

FIG. 3 shows a method of setting and changing appearance of UAV 100 when it is unaffected by appearances of other UAVs 100, but as discussed previously, there may be situations where such appearance conflicts occur. While central controller 142 can resolve such conflicts, in some embodiments, central controller 142 is out of range of communication with the UAVs 100 at issue or central controller 142 is absent from the environment entirely. In such embodiments, the UAVs 100 at issue can resolve their conflicts using method 400. Therefore, FIG. 4 shows method 400 of setting the appearances of UAVs 100 in an operating environment with multiple UAVs 100 without a central controller 142 according to an embodiment of the present disclosure.

In the illustrated embodiment, method 400 starts at step 402. At step 404, the UAVs 100 each send out a heartbeat signal, and each UAV 100 listens for heartbeat signals from other UAVs 100. The heartbeat signal can be a short-range data transmission that includes at least a current location and a current appearance of a UAV 100, although the heartbeat signal can include other data, such as journey information. At step 406, it is determined whether two or more UAVs 100 receive each other's heartbeat signals. If not, then method 400 returns to step 404. If so, then at step 408, at least one of the communicating UAVs 100 determines whether there are two or more UAVs 100 with the same or substantially similar appearances. More specifically, a threshold value for similarity is used to compare the appearances to determine whether the appearances are the same or substantially similar. As stated previously, this threshold can be related to the amount of area of the displays 108 of UAVs 100 that display the same colorway and can be 66%, 75%, 85%, 90%, 95%, 98%, or 99%. If there is not the same or substantially similar appearances among UAVs 100, then method 400 returns to step 404. But if there is, then at step 410, the UAVs 100 with the same or substantially similar appearances are clustered together in order to resolve the appearance conflicts.

At step 412, a representative of the cluster is chosen from the UAVs 100 in the cluster, for example, by assigning a number to each UAV 100 in the cluster and using a random number generator to select the representative. In the illustrated embodiment, at step 414, the representative UAV 100 selects their own new appearance. This new appearance is not the conflicting appearance, and it is also not the same or substantially similar to an appearance of any non-cluster UAV 100 that is within heartbeat range. In alternate embodiments, the representative UAV 100 is allowed to keep the conflicting appearance since all of the other clustered UAVs 100 will be changing their appearances.

At step 416, the representative UAV 100 requests a desired appearance from another UAV 100 in the cluster. At step 418, the representative UAV 100 receives the desired appearance and evaluates it for being acceptable. This evaluation can be performed, for example, by comparing the desired appearance to the appearance of any non-cluster UAV 100 in heartbeat range and to the allowed and/or prohibited list of the representative UAV 100 (to incorporate information about the ambient environment into the evaluation process, for example, to avoid the other UAV 100 from taking on an appearance that is inappropriate given the ambient lighting conditions). If the desired appearance is unacceptable, then method 400 returns to step 416 wherein the other UAV 100 submits another desired appearance (which can be determined, for example, using the preference list of the other UAV 100). If the desired appearance is acceptable, then at step 420, the other UAV 100 sets it appearance to the desired appearance and can inform its respective user 132 of the change.

At step 422, the representative UAV 100 determines if there are more clustered UAVs 100. If so, then method 400 returns to step 416 wherein the representative UAV 100 requests a desired appearance from yet another UAV 100. The loop of steps 416-422 recurs until all members of the cluster from step 410 have changed their appearances to non-conflicting appearances. Then method 400 returns to step 404 because the UAVs 100 can be moving in and out of range with each other and/or changing their appearances.

Figure 5:
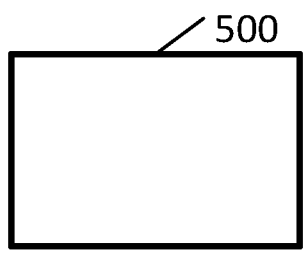
FIG. 5 is an array of exemplary UAV appearances according to embodiments of the present disclosure.
Figure 5:
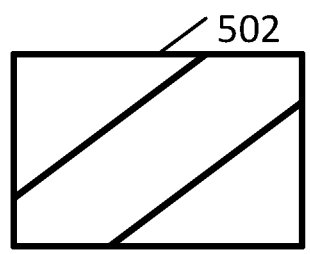
Figure 5:
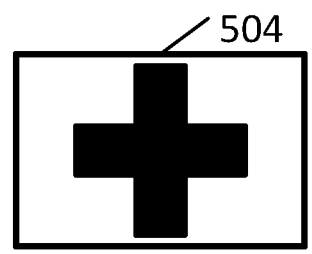
Figure 5:
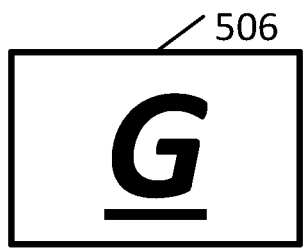
Figure 5:
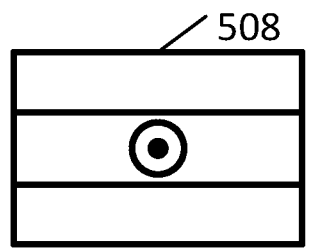
Figure 5:
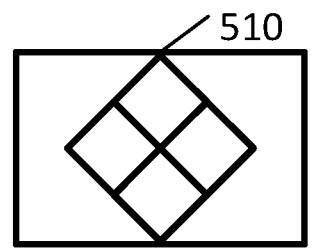

FIG. 5 is an array of exemplary appearances 500-510 for a UAV 100 according to embodiments of the present disclosure. Appearances 500-510 can be displayed on displays 108 and/or across substantially the entire exterior of body 102. Appearance 500 is a single, solid color. Appearance 502 is a pattern of different colors (i.e., a colorway). Appearance 504 is a well-recognized symbol (i.e., a red cross on a white background). Appearance 506 is an alpha-numeric character, which can be meaningful, for example, to the respective user 132 (shown in FIG. 2). Appearance 508 is a national or regional flag (e.g., the flag of India). Appearance 510 is a (material) safety data sheet (SDS/MSDS) that can convey information, for example, about a payload 134 (shown in FIG. 2) carried by a UAV 100.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An unmanned vehicle comprising:
   a body;
   a propulsion system connected to the body;
   a computing system connected to the body; and
   a display connected to an exterior of the body and electrically connected to the computing system;
   wherein the body is configured to connect to a payload for delivery to a user;
   wherein the payload includes a parcel that the unmanned vehicle transports to the user;
   wherein the computing system is configured to dynamically change a colorway of the display during operation of the unmanned vehicle; and
   wherein the colorway of the display is initially based on a colorway of the payload when the unmanned vehicle is transporting the payload to the user.

2. The unmanned vehicle of claim 1, wherein the unmanned vehicle is an unmanned aerial vehicle.

3. The unmanned vehicle of claim 1, further comprising a light sensor connected to the exterior of the body, wherein the colorway of the display is changed based on ambient light detected by the light sensor.

4. The unmanned vehicle of claim 1, wherein the display covers a majority of the body.

5. The unmanned vehicle of claim 1, wherein the computing system is further configured to sense a location of the unmanned vehicle, and wherein the colorway of the display is changed based on the location of the unmanned vehicle.

6. The unmanned vehicle of claim 5, wherein the computing system is further configured to autonomously navigate the unmanned vehicle from a source to a destination.

7. The unmanned vehicle of claim 1, wherein the computing system is further configured to communicate with other unmanned vehicles, and wherein the colorway of the display is changed based on communication with the other unmanned vehicles.

8. A method of controlling an unmanned vehicle comprising:
   receiving a first journey information, wherein the first journey information includes a first core purpose of the vehicle for a first journey;
   selecting a first colorway to display based on the first core purpose;
   comparing the first colorway to a prohibited appearance list;
   selecting a second colorway based on the first core purpose in response to determining that the first colorway was on the prohibited appearance list;
   setting an exterior display of the vehicle to the second colorway;
   monitoring a position of the vehicle during the first journey;
   changing the second colorway of the vehicle to a third colorway that is different from the second colorway based on the position of the vehicle;
   communicating the third colorway to a mobile device of a user, who is at a destination, to inform the user what the unmanned vehicle will look like when arriving at the destination.

9. The method of claim 8, further comprising monitoring ambient light conditions using a sensor on the vehicle during the first journey, wherein the first colorway is on the prohibited appearance list based on the monitored ambient light conditions.

10. The method of claim 8, further comprising:
    receiving a second journey information, wherein the second journey information includes a second core purpose of the vehicle for a second journey; and
    changing the exterior display of the vehicle to a fourth colorway based on the second core purpose;
    wherein the fourth colorway is different from the second colorway.

11. The method of claim 8, wherein the first journey information further comprises preferences of localities along a pathway, wherein the second colorway is selected based on the preferences of localities along the pathway.

12. A method of controlling a first unmanned vehicle comprises:
    receiving a journey information regarding a journey of the first unmanned vehicle;
    setting a first exterior display of the first unmanned vehicle to a first colorway based on the journey information;
    encountering a second unmanned vehicle while traveling such that the first unmanned vehicle and the second unmanned vehicle are in communication range with each other, the second unmanned vehicle having a second exterior display set to a second colorway that is substantially similar to the first colorway as to be at or above a threshold value for similarity; and
    changing the first exterior display of the first unmanned vehicle to a third colorway based on the first colorway and the second colorway being substantially similar, wherein the third colorway is different from the first colorway and the second colorway.

13. The method of claim 12, further comprising:
    requesting a desired colorway from the second unmanned vehicle;
    receiving the third colorway from the second unmanned vehicle; and
    approving the third colorway, wherein the changing the first exterior display is in response to the approving.

14. The method of claim 12, wherein the journey information includes a core purpose of the first unmanned vehicle for the journey, and the setting the first exterior display of the first unmanned vehicle to the first colorway is based on the core purpose.

15. The method of claim 8, wherein the prohibited appearance list is dynamic.

16. The method of claim 8, wherein the prohibited appearance list is based on a current location of the unmanned vehicle.

* * * * *